United States Patent
Sakakibara et al.

(10) Patent No.: US 10,549,598 B2
(45) Date of Patent: Feb. 4, 2020

(54) VEHICLE AIR-CONDITIONING APPARATUS

(71) Applicant: DENSO CORPORATION, Kariya, Aichi-pref. (JP)

(72) Inventors: Daisuke Sakakibara, Kariya (JP); Yasuhiro Sekito, Kariya (JP); Takahito Nakamura, Kariya (JP); Shinya Kato, Kariya (JP)

(73) Assignee: DENSO CORPORATION, Kariya, Aichi-pef. (JP)

( * ) Notice: Subject to any disclaimer, the term of this patent is extended or adjusted under 35 U.S.C. 154(b) by 199 days.

(21) Appl. No.: 15/567,413

(22) PCT Filed: Mar. 8, 2016

(86) PCT No.: PCT/JP2016/057235
§ 371 (c)(1),
(2) Date: Oct. 18, 2017

(87) PCT Pub. No.: WO2016/170862
PCT Pub. Date: Oct. 27, 2016

(65) Prior Publication Data
US 2018/0105013 A1    Apr. 19, 2018

(30) Foreign Application Priority Data

Apr. 24, 2015  (JP) ................. 2015-089528

(51) Int. Cl.
*F24F 7/00* (2006.01)
*B60H 1/00* (2006.01)

(52) U.S. Cl.
CPC ..... *B60H 1/00271* (2013.01); *B60H 1/00028* (2013.01); *B60H 2001/003* (2013.01)

(58) Field of Classification Search
CPC ............ B60H 1/00028; B60H 1/00371; B60H 1/00428; B60H 1/00521; B60H 1/3204;
(Continued)

(56) References Cited

U.S. PATENT DOCUMENTS 2,081,905 A * 6/1937 Ashley ............... B61D 27/0018
62/170
RE21,761 E * 4/1941 Ashley ............... B61D 27/0018
62/169
(Continued)

FOREIGN PATENT DOCUMENTS

JP    H08276722 A    10/1996
JP    H09020127 A    1/1997
(Continued)

*Primary Examiner* — Claire E Rojohn, III
(74) *Attorney, Agent, or Firm* — Harness, Dickey & Pierce, P.L.C.

(57) ABSTRACT

A vehicle air-conditioning apparatus includes a casing that defines an air passage through which an air flows, and a blower that has a blower fan generating an airflow in the air passage. The vehicle air-conditioning apparatus includes an air-conditioning device that is provided in the air passage, and an air introduction member that introduces an air from a vehicle compartment. The vehicle air-conditioning apparatus further includes an aspirator that is located outside the casing and takes in the air flowing through the air passage as a first air, the aspirator drawing the air from the vehicle compartment as a second air through the air introduction member by using a flow of the first air. A cooling target mounted in the vehicle is cooled by a flow of the air drawn from the vehicle compartment by the aspirator through the air introduction member.

7 Claims, 5 Drawing Sheets

(58) Field of Classification Search
CPC ...... B60H 1/00564; B60H 2001/00099; B60H 2001/00135; B60H 2001/00614; B61D 27/0018; Y02T 10/88; Y02T 30/42
USPC .................................................. 62/419, 239
See application file for complete search history.

(56) References Cited

U.S. PATENT DOCUMENTS

| | | | | |
|---|---|---|---|---|
| 2,592,712 | A * | 4/1952 | Knoy | F25B 27/02 62/101 |
| 2,780,077 | A * | 2/1957 | Jacobs | B60H 1/00007 62/243 |
| 3,320,761 | A * | 5/1967 | Gelbard | F25D 17/065 62/180 |
| 3,893,307 | A * | 7/1975 | Jacobs | F25D 17/065 62/150 |
| 4,623,090 | A * | 11/1986 | Heger | B60H 1/00471 236/49.1 |
| 4,626,720 | A * | 12/1986 | Fukasaku | H02K 9/06 310/227 |
| 4,814,653 | A * | 3/1989 | Hasegawa | F16C 37/00 310/62 |
| 5,364,025 | A * | 11/1994 | Terry | B60H 1/00457 236/49.1 |
| 5,473,912 | A * | 12/1995 | Stork | B60P 3/36 62/239 |
| 5,699,960 | A * | 12/1997 | Kato | B60H 1/0065 237/12.3 A |
| 5,731,953 | A * | 3/1998 | Sakurai | B60H 1/00271 361/695 |
| 5,955,803 | A * | 9/1999 | Gandhi | H02K 9/06 310/52 |
| 6,166,351 | A * | 12/2000 | Yamamoto | B60H 1/00064 219/202 |
| 6,505,807 | B1 * | 1/2003 | Nolting | B60H 1/00521 248/638 |
| 6,584,795 | B1 * | 7/2003 | Bruss | B60H 1/3233 62/285 |
| 2006/0242984 | A1 * | 11/2006 | Kang | B60H 1/00514 62/285 |
| 2007/0044492 | A1 * | 3/2007 | Ichikawa | B60H 1/00378 62/239 |
| 2007/0144727 | A1 * | 6/2007 | Hirayama | B60H 1/0005 165/203 |
| 2008/0115518 | A1 * | 5/2008 | Ozeki | B60H 1/00471 62/244 |
| 2009/0025904 | A1 * | 1/2009 | Tokunaga | B60H 1/00028 165/58 |
| 2009/0031741 | A1 * | 2/2009 | Hara | B60H 1/00735 62/239 |
| 2009/0208327 | A1 * | 8/2009 | Ito | F04D 25/166 415/143 |
| 2012/0247846 | A1 * | 10/2012 | Ichikawa | B60H 1/00207 180/65.21 |
| 2013/0156554 | A1 * | 6/2013 | Thawani | F04D 25/082 415/178 |
| 2015/0165866 | A1 * | 6/2015 | Kim | B60H 1/00792 165/11.1 |
| 2018/0105013 | A1 * | 4/2018 | Sakakibara | B60H 1/00028 |
| 2019/0126724 | A1 * | 5/2019 | Spunar | B60H 1/3227 |

FOREIGN PATENT DOCUMENTS

| | | |
|---|---|---|
| JP | H10157438 A | 6/1998 |
| JP | 2008189247 A * | 8/2008 |
| JP | 2009023592 A | 2/2009 |

* cited by examiner

VEHICLE AIR-CONDITIONING APPARATUS

CROSS REFERENCE TO RELATED APPLICATIONS

This application is a U.S. National Phase Application under 35 U.S.C. 371 of International Application No. PCT/JP2016/057235 filed on Mar. 8, 2016 and published in Japanese as WO 2016/170862 A1 on Oct. 27, 2016. This application is based on and claims the benefit of priority from Japanese Patent Application No. 2015-089528 filed on Apr. 24, 2015. The entire disclosures of all of the above applications are incorporated herein by reference.

TECHNICAL FIELD

The present disclosure relates to a vehicle air-conditioning apparatus.

BACKGROUND ART

Conventionally, among vehicle air-conditioning apparatuses which includes a cooling heat exchanger that cools air in a casing and a blower that is located downstream of the cooling heat exchanger and blows air to a vehicle compartment, there is a vehicle air-conditioning apparatus having the following configuration. In the vehicle air-conditioning apparatus, a cooling passage, through which an intake port that is open in the vehicle compartment communicates with a space located upstream of the cooling heat exchanger, is defined in the casing, and an electric motor is cooled by a vehicle inside air introduced into the space located upstream of the cooling heat exchanger through the cooling passage. For example, Patent Document 1 discloses such vehicle air-conditioning apparatus.

PRIOR ART DOCUMENT

Patent Document

Patent Document 1: JP 2009-23592 A

SUMMARY OF THE INVENTION

In the apparatus disclosed in the above-described Patent Document 1, since the cooling passage for cooling the electric motor of the blower is defined in the casing, a size of the casing may be large.

It may be considered that a cooling fan for cooling the electric motor of the blower is provided to cool the electric motor of the blower. However, when the electric motor is cooled by the cooling fan, the cooling fan and a motor for driving the cooling fan are needed, and accordingly the number of parts may increase and the configurations may be complicated.

In consideration of the above-described points, it is an objective of the present disclosure to provide a vehicle air-conditioning apparatus capable of cooling a cooling target with simple configurations without increasing of the size of the casing.

To achieve the above-described objective, according to an aspect of the present disclosure, a vehicle air-conditioning apparatus has the following configurations. The vehicle air-conditioning apparatus includes: a casing that defines an air passage through which an air flows; a blower that has a blower fan generating an airflow in the air passage; an air-conditioning device that is provided in the air passage and adjusts a temperature of the air flowing through the air passage; and an air introduction member that introduces an air from a vehicle compartment. The vehicle air-conditioning apparatus further includes an aspirator that is located outside the casing and takes in the air flowing through the air passage as a first air, the aspirator drawing the air from the vehicle compartment as a second air through the air introduction member by using a flow of the first air. A cooling target mounted in the vehicle is cooled by a flow of the air drawn from the vehicle compartment by the aspirator through the air introduction member.

According to this configuration, the cooling target mounted in the vehicle is cooled by the air drawn by the aspirator located outside the casing to passing through the air introduction member. According to such configurations, the cooling target can be cooled with a simple configuration without increasing of the size of the casing.

EMBODIMENTS FOR EXPLOITATION OF THE INVENTION

Figure 1:
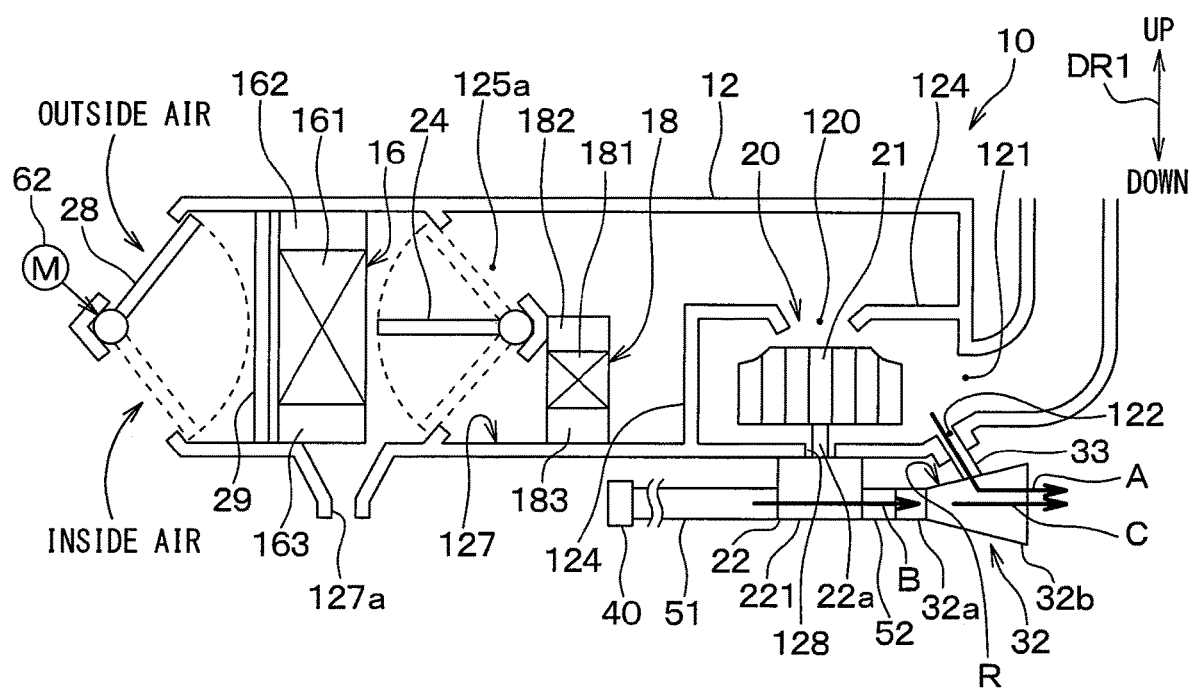
FIG. 1 is a cross-sectional diagram illustrating a main structure of a vehicle air-conditioning apparatus according to a first embodiment of the present disclosure.

Hereinafter, embodiments of the present disclosure will be described referring to drawings. Note that in the respective embodiments below, the same or equivalent parts are indicated by the same reference characters throughout the figures.

First Embodiment

Figure 2:
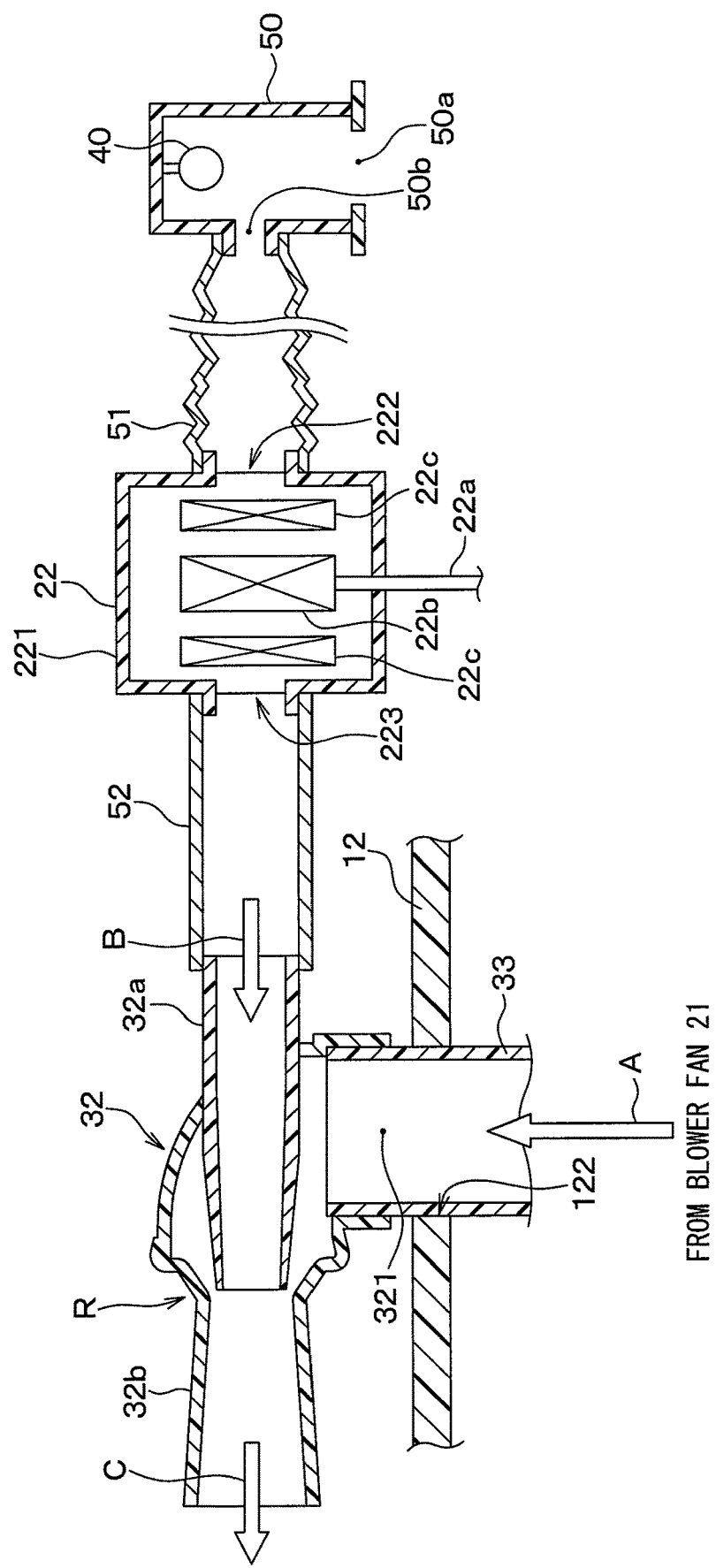
FIG. 2 is cross-sectional diagram illustrating positional relationships between an inside air temperature sensor, a housing of an electric motor, and an aspirator.

A vehicle air-conditioning apparatus 10 according to a first embodiment of the present disclosure will be described referring to FIGS. 1, 2. FIG. 1 is a cross-sectional diagram illustrating a main structure of the vehicle air-conditioning apparatus 10 according to the present embodiment. In FIG. 1, an inside air temperature sensor 40, an aspirator 32 that generates a flow in an air around the inside air temperature sensor 40, for example, are illustrated schematically. In FIG. 1, respective up and down arrows DR1 indicate the directions in a vehicle-mounted state where the vehicle air-conditioning apparatus 10 is mounted in a vehicle. That is, both end-arrows DR1 shown in FIG. 1 denote the up and down directions of the vehicle.

The vehicle air-conditioning apparatus 10 shown in FIG. 1 configures a part of a vehicle air conditioner including a compressor and a condenser that are disposed in an engine room of the vehicle. The vehicle air-conditioning apparatus 10 is disposed inside a dashboard, i.e. inside an instrument panel at the foremost portion of the vehicle compartment.

As shown in FIG. 1, the vehicle air-conditioning apparatus 10 includes an air-conditioning case 12, an inside/outside air switching door 28, an evaporator 16, a heater core 18, an air-mix door 24, a dust-proof filter 29, and a blower 20, for example. The vehicle air-conditioning apparatus 10 in this embodiment has a suction-type layout in which the blower 20 is disposed downstream of the evaporator 16 and the heater core 18 with respect to a flow of air.

The air-conditioning case 12 is a resin member that defines an air passage in which the air flows. FIG. 1 shows main parts of the entire air-conditioning case 12.

In the air-conditioning case 12, the inside/outside air switching door 28 that changes a ratio of an outside air that is an air outside the vehicle compartment to an inside air that is an air inside the vehicle compartment. The inside/outside air switching door 28 is driven by an electric actuator 62, and the electric actuator 62 is controlled by a control signal outputted from an air-conditioning control unit that is not shown.

The outside air as the air outside the vehicle compartment or the inside air as the air in the vehicle interior is introduced into the air-conditioning case 12 by the blower 20. The outside air or the inside air introduced into the air-conditioning case 12 flows into the evaporator 16 through the dust-proof filter 29.

The evaporator 16 is a cooling heat exchanger or a cooler that cools air flowing through the air-conditioning case 12. The evaporator 16 is accommodated in the air-conditioning case 12 and disposed to receive the inflow of the outside air or the inside air introduced into the air-conditioning case 12. The evaporator 16 configures a known refrigeration cycle device for circulation of a refrigerant together with a compressor, a condenser, and an expansion valve that are not shown. The evaporator 16 cools the air passing through the evaporator 16 by evaporation of the refrigerant.

The structure of the evaporator 16 is substantially the same as that of a known evaporator commonly used in a vehicle air conditioner. Specifically, the evaporator 16 includes a core portion 161 that cools the air flowing through the air-conditioning case 12 by heat exchange, a first header tank portion 162 disposed at an upper end of the core portion 161, and a second header tank portion 163 disposed at a lower end of the core portion 161. The core portion 161, the first header tank portion 162, and the second header tank portion 163 are formed of metal with high thermal conductivity, such as aluminum. The core portion 161 of the evaporator 16 includes multiple refrigerant tubes, each communicating with the header tank portions 162 and 163 and having a flat cross-sectional shape, and multiple corrugated fins formed in a wave shape and disposed between the adjacent refrigerant tubes. Furthermore, the core portion 161 has a structure in which the refrigerant tubes and the corrugated fins are alternately stacked in the vehicle front-rear direction.

The evaporator 16 exchanges heat between a low-temperature refrigerant flowing through the refrigerant tubes and air passing through the core portion 161, thereby cooling the air. The core portion 161 is partitioned into multiple fine air passages by the refrigerant tubes and the corrugated fins, so that in the core portion 161, the air mainly flows along the thickness direction of the core portion 161.

The heater core 18 is a heating heat exchanger, i.e. a heater, that heats the air flowing out of the evaporator 16 with an engine coolant, which is hot water. The heater core 18 is located downstream of the evaporator 16 in the air-conditioning case 12. The evaporator 16 and the heater core 18 are air-conditioning devices that adjust a temperature of the air flowing through the air passage in the air-conditioning case.

The structure of the heater core 18 is substantially the same as that of a known heating heat exchanger commonly used in a vehicle air conditioner. Specifically, the heater core 18 includes a core portion 181, and a first header tank portion 182 and a second header tank portion 183 which are respectively disposed at both ends of the core portion 181. The core portion 181 of the heater core 18 includes multiple hot-water tubes, each communicating with the header tank portions 182 and 183 and having a flat cross-sectional shape, and multiple corrugated fins formed in a wave shape and disposed between the adjacent hot-water tubes. Furthermore, the core portion 181 has a structure in which the hot-water tubes and the corrugated fins are alternately stacked in the vehicle front-rear direction.

The heater core 18 exchanges heat between a high-temperature engine coolant flowing through the hot-water tubes and the air passing through the core portion 181, thereby heating the air. The core portion 181 is partitioned into multiple fine air passages by the hot-water tubes and the corrugated fins, so that in the core portion 181, the air mainly flows along the thickness direction of the core portion 181.

The heater core 18 is spaced apart from the evaporator 16 and disposed in the air-conditioning case 12 such that an air outflow surface from which the air passing through the core portion 181 flows out is disposed in parallel with an air outflow surface from which the air passing through the core portion 161 of the evaporator 16.

The air-mix door 24 is provided between the heater core 18 and the evaporator 16. The air-mix door 24 has a rotation door mechanism and is adapted to rotate by an electric actuator that is not shown.

The air-mix door 24 adjusts, in accordance with its position, a ratio of a flow rate of an air passing through the heater core 18 to a flow rate of an air passing through a bypass passage 125a through which the air flows above the heater core 18 to bypass the heater core 18 in the air-conditioning case 12.

The blower 20 that generates an airflow in the air passage of the air-conditioning case 12 is located downstream of the heater core 18. The blower 20 includes a blower fan 21 and an electric motor 22. The electric motor 22 includes a rotation shaft 22a, and the blower fan 21 is fixed to a tip side of the rotation shaft 22a.

A fan accommodation portion 124 for accommodating the blower fan 21 is formed in the air-conditioning case 12, and the blower fan 21 is accommodated in the fan accommodation portion 124. The electric motor 22 is located outside the air-conditioning case 12.

A through-hole 128 is formed in a bottom surface 127 of the air-conditioning case 12 and extends through the bottom surface 127. The rotation shaft 22a is inserted into the through-hole 128, and the electric motor 22 is fixed to an outside of the air-conditioning case 12.

The blower fan 21 is fixed to the tip side of the rotation shaft 22a of the electric motor 22 in the fan accommodation portion 124. The electric motor 22 drives and rotates the blower fan 21, and the electric motor 22 is controlled by a control signal outputted by the air-conditioning control unit that is not shown.

The blower fan 21 is a centrifugal multi-blade fan having multiple blades that are arranged around the rotation shaft 22a of the electric motor 22 and not shown, and rotates about the rotation shaft 22a of the electric motor 22. The blower fan 21 draws the air from the tip side of the rotation shaft 22a of the electric motor 22 into a radially inner side and blows the air to a radially outer side. The tip side of the rotation shaft 22a of the electric motor 22 is an upper side in FIG. 1.

In the fan accommodation portion 124 of the air-conditioning case 12, an inflow port 120 through which the blower fan 21 draws the air, and opening portions 121, 122 through which the air blown by the blower fan 21 flows out are provided.

The inflow port 120 is provided on the tip side of the rotation shaft 22a of the electric motor 22. The tip side of the rotation shaft 22a of the electric motor 22 is the upper side in FIG. 1. The opening portions 121, 122 are provided in a surface of the fan accommodation portion 124 located radially outside the blower fan 21. Specifically, the opening portion 121 is provided in one lateral surface of the fan accommodation portion 124. The opening portion 122 is provided on a corner portion between the bottom surface 127 of the air-conditioning case 12 and the one lateral surface of the fan accommodation portion 124 in which the opening portion 121 is provided. The one lateral surface of the fan accommodation portion 124 is a lateral surface located on a right side in FIG. 1.

A drain hole 127a through which a condensed water generated in the evaporator 16 is drained is provided in the bottom surface 127 of the air-conditioning case 12. The condensed water is drained out of the air-conditioning case 12 through the drain hole 127a.

The blower fan 21 blows the air drawn through the intake port 120 provided on the tip side of the rotation shaft 22a of the electric motor 22 to the opening portions 121, 122 formed in the air-conditioning case 12. The tip side of the rotation shaft 22a of the electric motor 22 is the upper side in FIG. 1.

The opening portion 121 is connected, through a duct defining an air passage, to a face air outlet, a foot air outlet, and a defogger air outlet that are not shown and provided in the vehicle compartment. The opening portion 122 communicates with an aspirator 32 through a duct 33.

In common vehicles, the aspirator 32 that draws the inside air is provided. The aspirator 32 is connected to the inside air temperature sensor 40 through a hose 52, a housing 221 of the motor 22, and a hose 51 having a bellows shape. The aspirator 32 draws the inside air, and accordingly an airflow is generated around the inside air temperature sensor 40 disposed in the vehicle compartment. The aspirator 32 produces a negative pressure, i.e. a low-pressure condition, by the Venturi effect caused by the air blown by the blower 20, and the inside air is drawn by the negative pressure.

The vehicle air-conditioning apparatus mounted in the vehicle decides a blowing temperature of the conditioned air blown into the vehicle compartment based on the temperature of the inside air detected by the inside air temperature sensor 40, and performs an air-conditioning control to blow the conditioned air with the blowing temperature.

In the vehicle air-conditioning apparatus of the present embodiment, the electric motor 22 of the blower 20 is cooled by using the inside air around the inside air temperature sensor 40 drawn by the aspirator 32. In common vehicles, the inside air temperature sensor 40 is directly connected to the aspirator 32 through a hose having a bellows shape. In contrast, in the present embodiment, the housing 221 of the electric motor 22 is provided between the inside air temperature sensor 40 and the aspirator 32.

Next, the configurations of the aspirator 32 and the inside air temperature sensor 40, for example, are described with reference to FIG. 2. FIG. 2 is a cross-sectional diagram illustrating the main structure of the inside air temperature sensor 40, the electric motor 22, and the aspirator 32.

The inside air temperature sensor 40 is disposed in a sensor accommodation portion 50 that is located in the instrument panel of the vehicle compartment. In the sensor accommodation portion 50, an opening portion 50a that is open in the vehicle compartment and an intake port 50b through which the inside air is supplied to the aspirator 32 are provided. The hose 51 having a bellows shape through which the inside air is introduced into the aspirator 32 is connected to the intake port 50b. Since the inside air temperature sensor 40 is located separate from the aspirator 32, the inside air temperature sensor 40 is connected to the aspirator 32 through the hose 51 having a bellows shape.

The electric motor 22 of the blower 20 and the aspirator 32 are provided on an outer peripheral surface of the air-conditioning case 12 disposed in the instrument panel of the vehicle. The electric motor 22 is positioned such that the inside air flowing through the hose 51 contacts the electric motor 22.

The electric motor 22 includes the resin housing 221 which accommodates a rotor 22b attached to the rotation shaft 22a of the electric motor 22 and a stator 22c that generates a rotational moment by interacting with the rotor 22b. The housing 221 has an opening portion 222 through which the air around the inside air temperature sensor 40 is drawn and an opening portion 223 through which the air drawn into the housing 221 flows out. The opening portion 222 formed in the housing 221 of the electric motor 22 is connected, through the hose 51 having a bellows shape, to the intake port 50b of the sensor accommodation portion 50 in which the inside air temperature sensor 40 is provided.

The aspirator 32 includes a resin nozzle 32a having a circular cylindrical shape and a cylindrical resin venturi 32b having a L-shape. The nozzle 32a and the venturi 32b are bonded by adhesion or the like.

The duct 33 connected to the opening portion 122 of the air-conditioning case 12 is inserted into and fixed to one side of the venturi 32b in an airtight manner, and the aspirator 32 is attached to the air-conditioning case 12 integrally. In the vehicle air-conditioning apparatus of the present embodiment, the air in the air-conditioning case 12 is introduced into the venturi 32b through the duct 33. The venturi 32b includes a throttle portion R that throttles the air introduced into the venturi 32b. The other side of the venturi 32b is open toward an opening space in the instrument panel of the vehicle. The throttle portion R is a minimum diameter portion.

One end of the nozzle 32a communicates with the opening portion 222 of the housing 221 of the electric motor 22 through the hose 52, and the other end of the nozzle 32a is open at the minimum diameter portion R of the venturi 32b. The hose 51 and the hose 52 are air introduction members that introducing the inside air into the aspirator 32.

When the air is introduced into the venturi 32b as indicated by an arrow A, a velocity of the air flowing through the throttle portion R increases, and accordingly a pressure of the air passing through the throttle portion R is decreased due to the Venturi effect. The inside air is drawn as indicated by an arrow B through the nozzle 32a to the throttle portion R in which the pressure is decreased.

The aspirator 32 introduces the air flowing through the air passage of the air-conditioning case 12 as a first air. The aspirator 32 draws the air in the vehicle compartment as a second air through the hose 51, the housing 221 of the electric motor 22, and the hose 52, and the aspirator 32 discharges the first air and the second air into the opening space in the instrument panel of the vehicle.

Next, actuations of the vehicle air-conditioning apparatus of the present disclosure will be described below. When the blower 20 is actuated, the outside air that is an air outside the vehicle or the inside air that is an air inside the vehicle is introduced into the air-conditioning case 12, in accordance with the position of the inside/outside air switching door 28.

Subsequently, the air passes through the dust-proof filter 29 and is cooled by the evaporator 16 to be a cool air. The cool air is separated, in accordance with the position of the air-mix door 24, into a cool air flowing through a bypass passage 125a, which is located above the heater core 18 and bypasses the heater core 18, and a warm air passing through the heater core 18 to be heated. The cool air and the warm air are joined together on a downstream side of the heater core 18.

The cool air and the warm air are mixed to be an air with a predetermined temperature in a confluent region located downstream of the heater core 18. Accordingly, the air mixed around the confluent region located downstream of the heater core 18 can be adjusted to a desired temperature by adjusting a ratio of the cool air to the hot air in accordance with the position of the air-mix door 24.

The blower 20 draws the mixed air on the downstream side of the heater core 18 through the inflow port 120 of the fan accommodation portion 124 and blows out the air to radially outer side. A part of the air blown by the blower 20 flows through the opening portion 121 and the duct defining the air passage that is not shown, and flows through the face air outlet, the foot air outlet, and the defogger air outlet that are not shown into the vehicle compartment. The rest part of the air blown by the blower 20 is introduced into the venturi 32b of the aspirator 32 through the opening portion 122 and the duct 33, as indicated by the arrow A in FIG. 2. At this time, the air passing through the throttle portion R of the venturi 32b is decompressed, and the air is drawn from the nozzle 32a, as indicated by the arrow B. Accordingly, the inside air around the inside air temperature sensor 40 is introduced into the housing 221 of the electric motor 22 through the hose 51, and the air introduced into the housing 221 is introduced into the venturi 32b through the hose 52 and the nozzle 32a after passing through the inside of the housing 221.

When the inside air around the inside air temperature sensor 40 flows through an inside space of the housing 221 of the electric motor 22, the inside air contacts components provided in the housing 221, and accordingly the inside air cools the components by heat exchange.

The air introduced into the venturi 32b through the nozzle 32a is discharged toward the opening space in the instrument panel of the vehicle as indicated by an arrow C.

As described above, the vehicle air-conditioning apparatus 10 of the present disclosure includes the air-conditioning case 12 defining the air passage through which the air flows, the blower 20 having the blower fan 21 that generates the airflow in the air passage, and the air-conditioning devices 16, 18 located in the air passage and adjusting the temperature of the air flowing in the air passage. The vehicle air-conditioning apparatus 10 of the present disclosure further includes the hoses 51, 52 through which the inside air is drawn, and the aspirator 32 located outside the case. The aspirator 32 introduces the air flowing in the air passage as the first air, and draws the inside air as the second air through the hoses 51, 52 by the flow of the first air. The electric motor 22 driving the blower fan 21 is cooled by the inside air drawn by the aspirator 32 to flow through the hoses 51, 52.

According to such configurations, the electric motor 22 that is a cooling target mounted in the vehicle is cooled by the air drawn by the aspirator located outside the case to flow through the hoses 51, 52. Therefore, the cooling target can be cooled with a simple structure without increase of size of the casing.

Moreover, the inside air temperature sensor 40 that detects the temperature of the air inside the vehicle is provided in the vehicle compartment, and the aspirator 32 is configured to draw the air around the inside air temperature sensor 40 through the hoses 51, 52. According to such configurations, since the aspirator 32 drawing the air around the inside air temperature sensor 40 can be leveraged, the configurations can be simplified, and the cost can be reduced.

In the air-conditioning case 12, the opening portion 122 through which the air flowing through the air passage of the air-conditioning case 12 is introduced into the aspirator 32 is located downstream of the blower 20. According to this configuration, the air flowing through the air passage in the air-conditioning case 12 can be introduced into the aspirator 32 by using the opening portion 122 that is located downstream of the blower 20.

In the vehicle air-conditioning apparatus 10 of the present embodiment, the air in the air-conditioning case 12 is supplied to the venturi 32b through the duct 33. Therefore, it may be considered that the electric motor 22 of the blower fan 21 is cooled by directly contacting the air supplied from the air-conditioning case 12 through the duct 33. In the vehicle air-conditioning apparatus 10 having a suction-type layout as in the present embodiment, since the duct 33 is located downstream of the evaporator 16, a relative humidity of the air supplied through the duct 33 is high. Accordingly, when the air supplied through the duct 33 directly contacts the electric motor 22 of the blower fan 21 in the vehicle air-conditioning apparatus 10, a condensed water may occur on the electric motor 22.

In contrast, in the vehicle air-conditioning apparatus 10 of the present embodiment, the blower 20 is located downstream of the air-conditioning devices 16, 18, and the aspirator 32 draws the inside air by using the air introduced through the duct 33 from the air-conditioning case 12. In the vehicle air-conditioning apparatus 10 of the present embodiment, the cooling target is cooled by the inside air. Therefore, the vehicle air-conditioning apparatus 10 is capable of cooling the cooling target without generating the condensed water on the cooling target.

Second Embodiment

Figure 3:
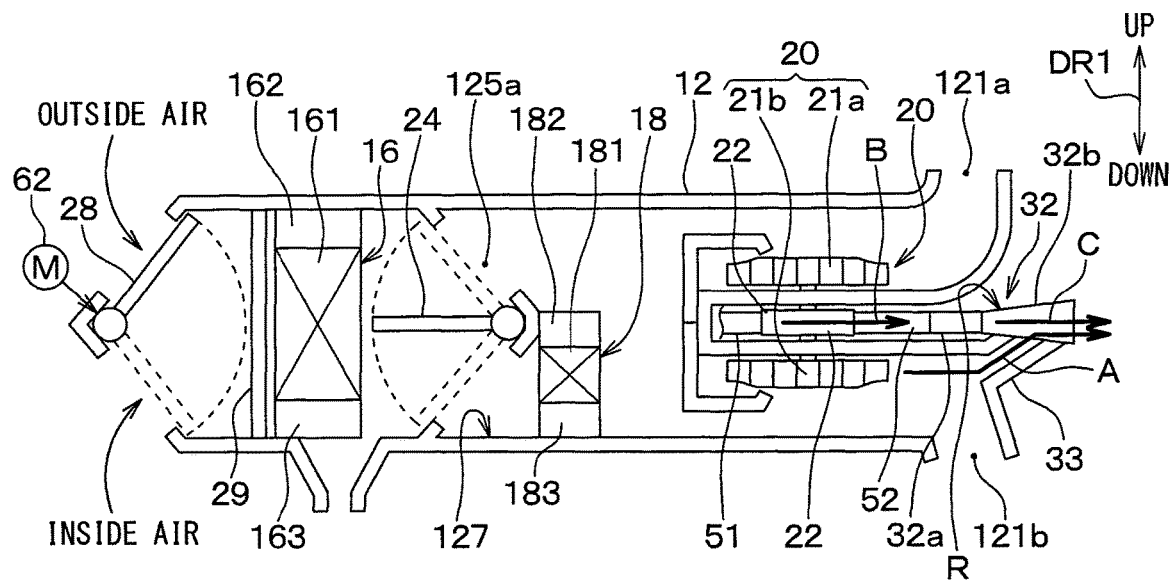
FIG. 3 is a cross-sectional diagram illustrating a main structure of a vehicle air-conditioning apparatus according to a second embodiment of the present disclosure.

A vehicle air-conditioning apparatus 10 of a second embodiment of the present disclosure will be described referring to FIG. 3. FIG. 3 is a cross-sectional diagram illustrating a main structure of the vehicle air-conditioning apparatus 10 of the present embodiment. In FIG. 3, an inside air temperature sensor 40 is omitted, but the inside air temperature sensor 40 is disposed in the sensor accommodation portion 50 provided in the instrument panel of the vehicle in the present embodiment. As in the first embodiment, the sensor accommodation portion 50 housing the inside air temperature sensor 40 is connected to the electronic motor 22 through the hose 51 having a bellows shape.

The vehicle air-conditioning apparatus 10 of the above-described first embodiment includes the blower 20 having one blower fan 21, but the vehicle air-conditioning apparatus 10 of the present embodiment includes the blower 20 having two blower fans 21a, 21b. The blower 20 of the present embodiment is configured as a double fan that drives the two blower fans 21a, 21b by one motor 22. The blower fan 21a is located in an upper part in the air-conditioning case 12, and the blower fan 21b is located in a lower part in the air-conditioning case 12.

The blower fan 21a is fixed to one end of the rotation shaft of the motor 22, and the blower fan 21b is fixed to the other end of the rotation shaft of the motor 22. The blower fan 21a and the blower fan 21b are rotated about the rotation shaft of the motor 22.

The blower fan 21a mainly draws the air cooled by the evaporator 16 from one end side (upper side in FIG. 3) of the motor 22 and blows the air radially outward. In the present embodiment, the air blown by the blower fan 21a is sent to the vehicle compartment through the opening portion 121a of the air-conditioning case 12, the face air outlet, and the defogger air outlet.

The blower fan 21b mainly draws the air heated by the heater core 18 from the other end side of the motor 22 and blows the air radially outward. In the present embodiment, the air blown by the blower fan 21b is sent to the vehicle compartment through the opening portion 121b of the air-conditioning case 12 and the foot air outlet. A part of the air blown by the blower fan 21b is introduced into the venturi 32b of the aspirator 32 through the duct 33.

When the blower 20 is driven in the above-described configurations, the outside air that is an air outside the vehicle compartment or the inside air that is an air inside the vehicle compartment is introduced into the air-conditioning case 12 in accordance with the position of the inside/outside air switching door 28.

Subsequently, the air passes through the dust-proof filter 29 and is cooled by the evaporator 16 to be a cool air. The cool air is separated into a cool air flowing through the bypass passage 125a located above the heater core and bypassing the heater core 18, and a warm air heated by passing through the heater core 18, in accordance with the position of the air-mix door 24.

The cool air passing through the bypass passage 125a is mainly drawn by the blower fan 21a and sent to the vehicle compartment by the blower fan 21a through the opening portion 121a of the air-conditioning case 12, the face air outlet, and the defogger air outlet.

On the other hand, a part of the warm air heated by passing through the heater core 18 is mainly drawn by the blower fan 21b and sent to the vehicle compartment by the blower fan 21b through the opening portion 121b of the air-conditioning case 12 and the foot air outlet.

The rest part of the warm air heated by passing through the heater core 18 is introduced into the venturi 32b of the aspirator 32 through the duct 33, and the air inside the vehicle compartment is drawn from the nozzle 32a by Venturi effect, as indicated by an arrow B. That is, the air around the inside air temperature sensor 40 is introduced into the housing 221 of the electric motor 22 through the hose 51, and the air introduced into the housing 221 is introduced into the venturi 32b through the hose 52 and the nozzle 32a after passing through the inside space of the housing 221.

When the air around the inside air temperature sensor 40 passes through the inside space of the housing 221 of the electric motor 22, the components disposed in the housing 221 is cooled by heat exchange.

The air introduced into the venturi 32b through the nozzle 32a is discharged toward the opening space in the instrument panel of the vehicle as indicated by an arrow C.

In the present embodiment, the effects derived from the configuration common to the above-described first embodiment can be obtained similarly to the first embodiment.

In the present embodiment, the space in which the cool air passing through the bypass passage 125a and the warm air heated by passing through the heater core 18 are mixed is located upstream of the blower 20. The present disclosure can be used in an air-conditioning unit which has an inside/outside two-layer flow mode. This air-conditioning unit includes an upper space and a lower space in the air-conditioning case 12, and the outside air flows in the upper space and the inside air flows in the lower space in the inside/outside two-layer flow mode.

In the present embodiment, a part of the air blown by the blower fan 21b is introduced into the venturi 32b of the aspirator 32 through the duct 33. A part of the air blown by the blower fan 21a may be introduced into the venturi 32b of the aspirator 32 through the duct 33.

Third Embodiment

Figure 4:
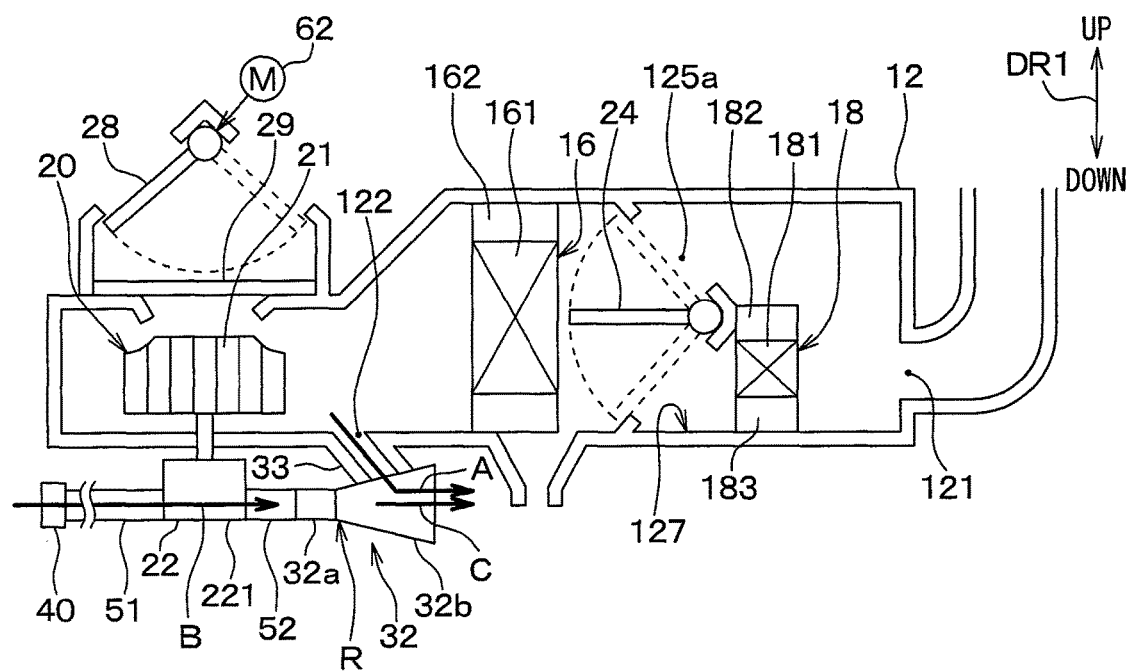
FIG. 4 is a cross-sectional diagram illustrating a main structure of a vehicle air-conditioning apparatus according to a third embodiment of the present disclosure.

A vehicle air-conditioning apparatus 10 according to a third embodiment of the present disclosure will be described referring to FIG. 4. FIG. 4 is a cross-sectional diagram illustrating a main structure of the vehicle air-conditioning apparatus 10 of the present embodiment.

The vehicle air-conditioning apparatus 10 of the above-described first embodiment has a suction-type layout in which the blower 20 is located downstream of the evaporator 16 and the heater core 18. In contrast, the vehicle air-conditioning apparatus 10 of the present embodiment has a pushing-type layout in which the blower 20 is located upstream of the evaporator 16 and the heater core 18.

The air-conditioning case 12 has the opening portion 122 through which the air blown by the blower fan 21 is discharged, and the opening portion 122 communicates with the aspirator 32 through the duct 33.

In such configurations, when the blower 20 is actuated, the outside air that is an air outside the vehicle compartment or the inside air that is an air inside the vehicle compartment is introduced into the air-conditioning case 12, in accordance with the position of the inside/outside air switching door 28.

The blower fan 21 draws the air introduced into the air-conditioning case 12 from the tip side of the rotation shaft 22a of the electric motor 22 into a radially inner side, and blows the air radially outward. The air blown by the blower fan 21 is introduced mainly into the evaporator 16. A part of the air blown by the blower fan 21 is introduced into the venturi 32b of the aspirator 32 from the opening portion 122 through the duct 33, and the air inside the vehicle compartment is drawn from the nozzle 32a by the Venturi effect as indicated by the arrow B. That is, the air around the inside air temperature sensor 40 is introduced into the housing 221 of the electric motor 22 through the hose 51, and the air introduced into the housing 221 passes through the inside space of the housing 221, and subsequently the air is introduced into the venturi 32b through the hose 52 and the nozzle 32a. The tip side of the rotation shaft 22a of the electric motor 22 is an upper side in FIG. 4.

When the air around the inside air temperature sensor 40 passes through the inside space of the housing 221 of the electric motor 22, the air cools components provided in the housing 221 by heat exchange.

The air introduced into the venturi 32b through the nozzle 32a is discharged toward the opening space in the instrument panel of the vehicle as indicated by the arrow C.

The air introduced into the evaporator 16 from the blower fan 21 is cooled by the evaporator 16 to be a cool air. The cool air is separated, in accordance with the position of the air-mix door 24, into a cool air passing through the bypass passage 125a located above the heater core 18 and bypassing the heater core 18, and a warm air heated by passing through the heater core 18.

The cool air passing through the bypass passage 125a is mainly drawn by the blower fan 21a, and subsequently the cool air is sent to the vehicle compartment by the blower fan 21a through the opening portion 121a of the air-conditioning case 12, the face air opening, and the defogger air outlet.

Fourth Embodiment

Figure 5:
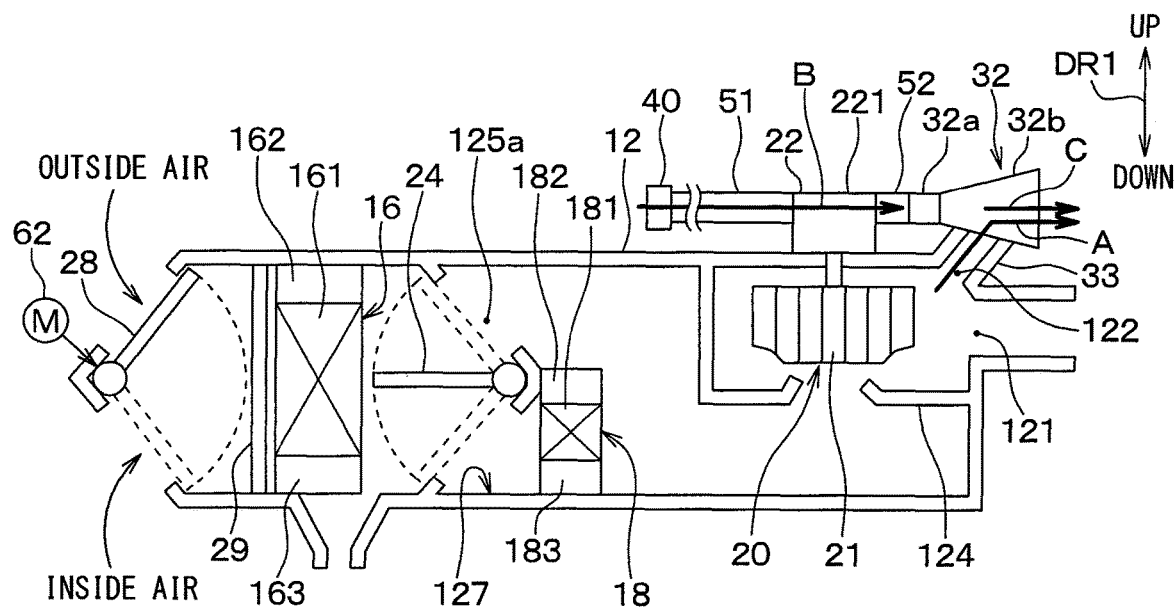
FIG. 5 is a cross-sectional diagram illustrating a main structure of a vehicle air-conditioning apparatus according to a fourth embodiment of the present disclosure.

A vehicle air-conditioning apparatus 10 according to a fourth embodiment of the present disclosure will be described with reference to FIG. 5. FIG. 5 is a cross-sectional diagram illustrating a main structure of the vehicle air-conditioning apparatus 10 of the present embodiment.

In the vehicle air-conditioning apparatus 10 of the above-described first embodiment, the blower 20 is provided on the bottom surface 127 of the air-conditioning case 12. In contrast, the vehicle air-conditioning apparatus 10 of the present embodiment is different from the first embodiment in that the blower 20 is provided on an upper surface of the air-conditioning case 12. The present disclosure can be adopted to such vehicle air-conditioning apparatus 10 in which the blower 20 is provided on the upper surface of the air-conditioning case 12.

Fifth Embodiment

Figure 6:
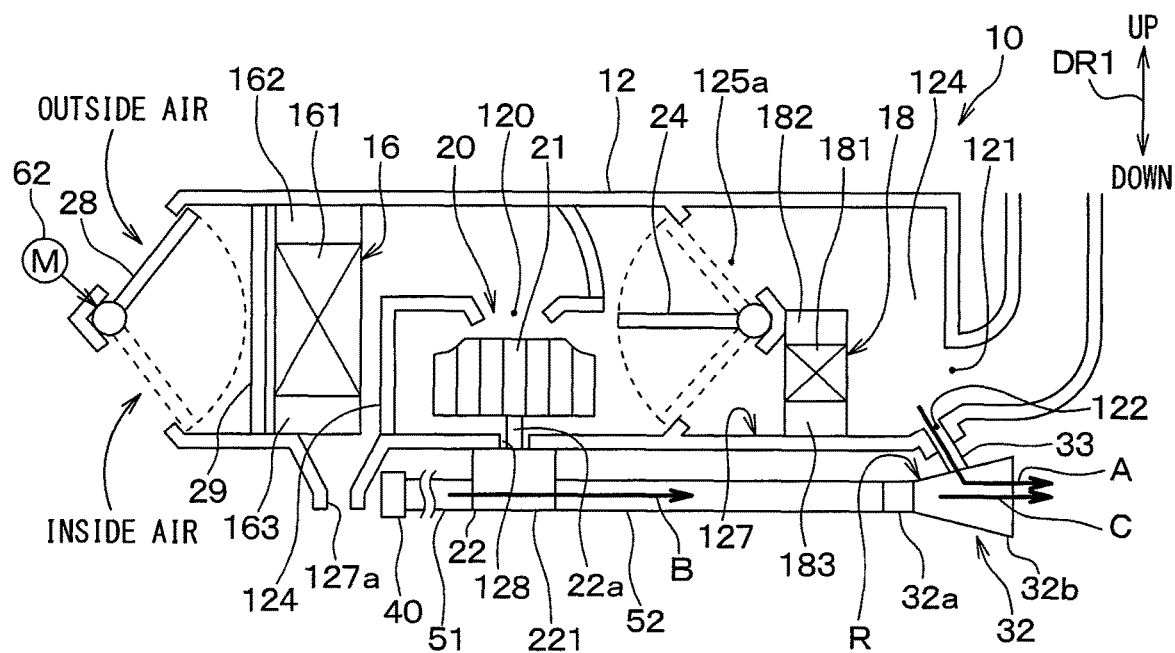
FIG. 6 is a cross-sectional diagram illustrating a main structure of a vehicle air-conditioning apparatus according to a fifth embodiment of the present disclosure.
Figure 7:
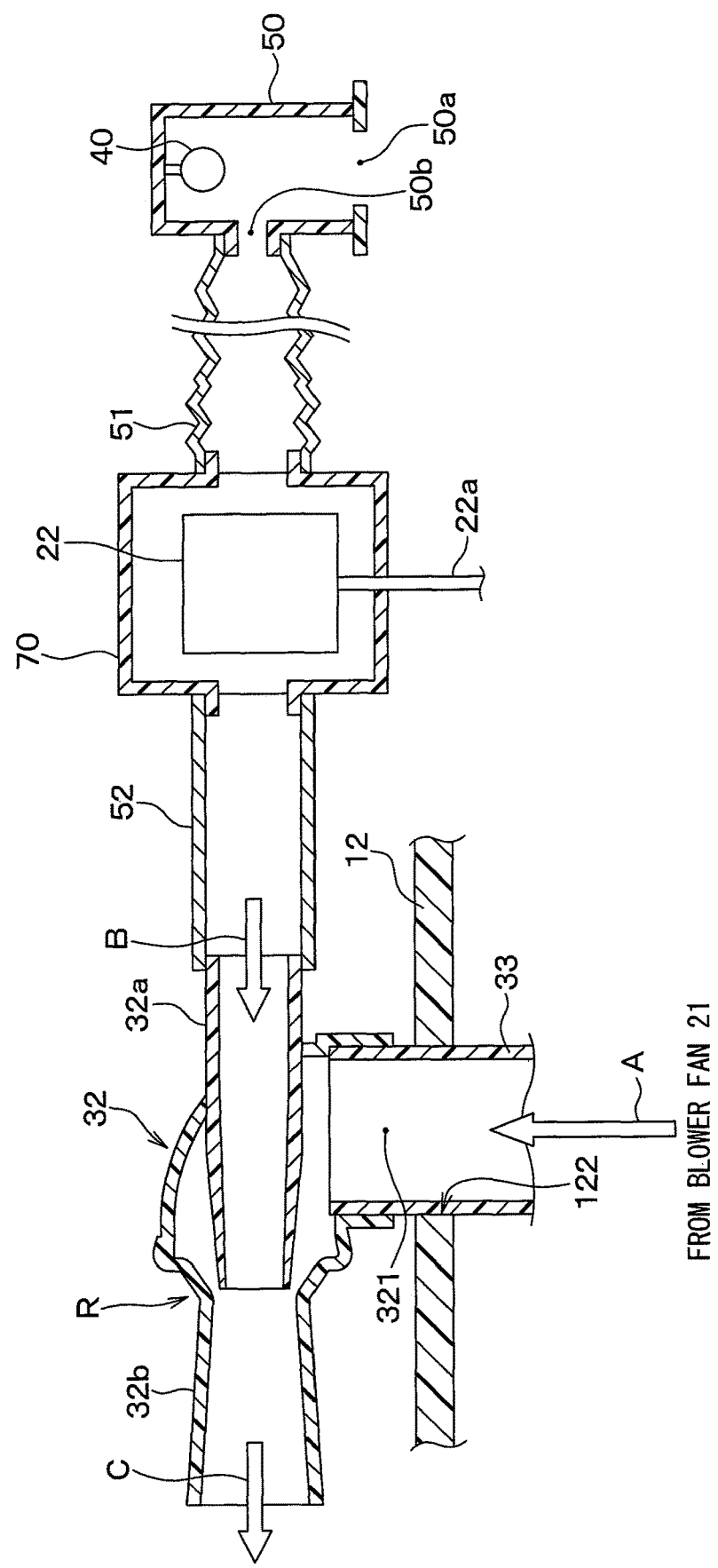
FIG. 7 is a diagram for explaining a modification example.

A vehicle air-conditioning apparatus 10 according to a fifth embodiment of the present disclosure will be described with reference to FIG. 6. FIG. 6 is a cross-sectional diagram illustrating a main structure of the vehicle air-conditioning apparatus 10 of the present embodiment.

In the vehicle air-conditioning apparatus 10 of the above-described first embodiment, the blower 20 is located downstream of the evaporator 16 and the heater core 18. In contrast, in the vehicle air-conditioning apparatus 10 of the present embodiment, the blower 20 is located downstream of the evaporator 16 and upstream of the heater core 18 as shown in FIG. 6.

The opening portion 122 through which the air blown by the blower fan 21 is discharged is provided in the air-conditioning case 12, and the opening portion 122 communicates with the aspirator 32 through the duct 33.

In this configuration, when the blower 20 is actuated, the outside air that is an air outside the vehicle compartment or the inside air that is an air inside the vehicle compartment is introduced into the air-conditioning case 12, in accordance with the position of the inside/outside air switching door 28.

Subsequently, the air passes through the dust-proof filter 29 and is cooled by the evaporator 16 to be the cool air.

The blower fan 21 draws the air, which is introduced into the air-conditioning case 12 and cooled by the evaporator 16, from the tip side of the rotation shaft 22a of the electric motor 22 to radially inner side, and the blower fan 21 blows the air radially outward. The air blown by the blower fan 21 is separated into a cool air, which passes through the bypass passage 125a located above the heater core 18 to bypass the heater core 18, and a warm air, which is heated by flowing through the heater core 18, in accordance with the position of the air-mix door 24. The cool air and the warm air are joined together in a downstream side of the heater core 18. The tip side of the rotation shaft 22a of the electric motor 22 is an upper side in FIG. 6.

The cool air and the warm air are mixed in the confluent region located downstream of the heater core 18 to have a predetermined temperature. Accordingly, the ratio of the cool air to the warm air is adjusted in accordance with the position of the air-mix door 24, and the temperature of the mixed air around the confluent region located downstream of the heater core 18 can be adjusted to be a desired temperature.

The air blown by the blower fan 21 whose temperature is adjusted is mainly blown out to the vehicle compartment from the face air outlet, the foot air outlet, and the defogger air outlet that are not shown through the opening portion 121 and the duct defining the air passage that is not shown. The rest part of the air blown by the blower 20 is introduced into the venturi 32b of the aspirator 32 through the opening portion 122 and the duct 33 as indicated by the arrow A in FIG. 6. At this time, the air passing through the throttle portion R of the venturi 32b is decompressed, and the air is drawn through the nozzle 32a as indicated by the arrow B. According to this, the air inside the vehicle compartment around the inside air temperature sensor 40 is introduced into the housing 221 of the electric motor 22 through the hose 51, and the air introduced into the housing 221 passes through the inside space of the housing 221, and subsequently the air is introduced into the venturi 32b through the hose 52 and the nozzle 32a.

The air around the inside air temperature sensor 40 contacts components provided inside the housing 221 when the air passes through the inside of the housing 221 of the electric motor 22, and the components are cooled by heat exchange.

The air introduced into the venturi 32b through the nozzle 32a is discharged toward the opening space in the instrument panel of the vehicle, as indicated by the arrow C.

Other Embodiments

The present disclosure is not limited to the above-described embodiments, and it is to be noted that various changes and modifications will become apparent to those skilled in the art.

(1) In the above-described embodiments, the opening portion 122 of the air-conditioning case 12 communicates with the air-conditioning air suction port 32c of the aspirator 32 through the duct 33, but the air-conditioning air suction port 32c of the aspirator 32 may be directly connected to the opening portion 122 of the air-conditioning case 12.

(2) In the above-described embodiments, the electric motor 22 is cooled by introducing, into the housing 221 of the electric motor 22 that is the cooling target, the air drawn by the aspirator 32. For example, a cooling case 70 accommodating the electric motor 22 that is the cooling target may be provided, and the cooling target may be cooled by the air drawn by the aspirator 32 into the cooling case 70, as shown in FIG. 6. According to this configuration, the cooling target can be cooled without changing the shape of the cooling target.

(3) In the above-described embodiments, the electric motor 22 that actuates the blower fan 21 and is the cooling target is cooled by the air drawn by the aspirator 32. The cooling target is not limited to the electric motor 22 but may be a navigation device mounted in the vehicle or at least one electric member of a head-up display and a meter.

(4) In the above-described embodiments, the inside air temperature sensor 40 detecting the temperature of the inside air is provided in the vehicle compartment, and the aspirator 32 draws the inside air around the inside air temperature sensor 40 through the hoses 51, 52. However, in the above-described embodiments, the inside air temperature sensor 40 detecting the temperature of the inside air may not necessarily be provided in the vehicle compartment.

(5) The blower fan 21 is provided close to the bottom surface 127 of the air-conditioning case 12 in the above-described first embodiment, and the blower fan 21 is provided on the upper surface of the air-conditioning case 12 in the above-described fourth embodiment. However, the positions of the blower fan 21 and the electric motor 22 are not limited to the above-described embodiments.

(6) In the above-described embodiments, the blower fan 21 is the centrifugal multi-blades fan. However, the blower fan 21 is not limited to the centrifugal multi-blades fan, and a sirocco fan may be used as the blower fan 21, for example.

(7) In the above-described embodiments, the inside/outside air switching door 28 is driven by the electric actuator 62, but the inside/outside air switching door 28 may be actuated by a manual operation of occupants.

The present disclosure is not limited to the above-described embodiments. In the above-described embodiments, it is needless to say that elements constituting the embodiments are not essential except for a case of being explicitly specified to be essential and a case of being considered to be absolutely essential in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members are described in the above-described embodiments, it is to be understood that such feature is not limited to a specific material, shape, positional relation, or the like except for a case of being explicitly specified to be necessary and a case of being considered to be absolutely necessary in principle.

What is claimed is:

1. A vehicle air-conditioning apparatus mounted in a vehicle, the vehicle air-conditioning apparatus comprising:
    a casing that defines an air passage through which an air flows;
    a blower that has a blower fan generating an airflow in the air passage;
    an air-conditioning device that is provided in the air passage and adjusts a temperature of the air flowing through the air passage;
    an air introduction member that introduces an air from a vehicle compartment; and
    an aspirator that is located outside the casing and takes in the air flowing through the air passage as a first air, the aspirator drawing the air from the vehicle compartment as a second air through the air introduction member by using a flow of the first air, wherein
    a cooling target mounted in the vehicle is cooled by a flow of the air drawn from the vehicle compartment by the aspirator through the air introduction member, and
    the cooling target is an electric motor that is located outside the casing and actuates the blower fan.

2. The vehicle air-conditioning apparatus according to claim 1, wherein
    an inside air temperature sensor that detects a temperature of the air in the vehicle compartment is provided in the vehicle compartment, and
    the aspirator draws the air around the inside air temperature sensor from the vehicle compartment through the air introduction member.

3. The vehicle air-conditioning apparatus according to claim 1, wherein
    the cooling target is positioned to be in contact with the air flowing through the air introduction member from the vehicle compartment.

4. The vehicle air-conditioning apparatus according to claim 1, further comprising:
    a cooling case that accommodates the cooling target, wherein
    the air in the vehicle compartment flowing through the air introduction member is introduced into the cooling case.

5. The vehicle air-conditioning apparatus according to claim 1, wherein
    the casing has an opening portion that is located downstream of the blower, and
    the air flowing through the air passage in the casing is introduced into the aspirator through the opening portion.

6. The vehicle air-conditioning apparatus according to claim 1, wherein
    the blower is located downstream of the air-conditioning device.

7. The vehicle air-conditioning apparatus according to claim 1, wherein
    the air-conditioning device includes a cooler that cools the air flowing in the casing, and a heater that heats the air flowing out of the cooler, and
    the blower is located downstream of the cooler and upstream of the heater.

* * * * *